(12) United States Patent
Summers

(10) Patent No.: US 6,935,668 B1
(45) Date of Patent: Aug. 30, 2005

(54) A-FRAME MOUNTED ON A FLAT BED TRAILER

(76) Inventor: Robert R. Summers, 1112 Mandarin Dr., Holiday, FL (US) 34691

( * ) Notice: Subject to any disclaimer, the term of this patent is extended or adjusted under 35 U.S.C. 154(b) by 0 days.

(21) Appl. No.: 10/799,484

(22) Filed: Mar. 12, 2004

(51) Int. Cl.$^7$ ................................................ B60P 3/00
(52) U.S. Cl. .......................................... 296/3; 280/143
(58) Field of Search ...................... 296/3, 43; 410/32, 410/34, 35, 36, 37, 92; 280/143, 404; 105/380

(56) References Cited

U.S. PATENT DOCUMENTS

| | | | |
|---|---|---|---|
| 2,999,693 A | * | 9/1961 | Thorson ..................... 410/42 |
| 3,902,612 A | * | 9/1975 | Hall ............................ 410/42 |
| 3,941,406 A | * | 3/1976 | Eggleston ..................... 296/3 |
| 3,955,676 A | | 5/1976 | Hansen et al. |
| 4,273,485 A | | 6/1981 | Fischer et al. |
| 4,527,826 A | * | 7/1985 | O'Neal ......................... 296/3 |
| 4,626,017 A | | 12/1986 | Robertson |
| 4,688,976 A | | 8/1987 | Rowley et al. |
| 5,209,540 A | | 5/1993 | Metler |
| 5,494,327 A | * | 2/1996 | Derecktor ..................... 296/3 |
| 5,836,635 A | * | 11/1998 | Dorman ........................ 296/3 |
| 6,203,259 B1 | * | 3/2001 | Christensen ................. 410/34 |
| 6,299,395 B1 | | 10/2001 | Eriksson |

* cited by examiner

*Primary Examiner*—Lori L. Coletta
(74) *Attorney, Agent, or Firm*—Larson & Larson, PA; Herbert W. Larson

(57) ABSTRACT

A pair of opposed A-frames are positioned uprightly on a flat bed chassis. A downwardly descending side leg on each side of each A-frame rests on an axially mounted beam. The beam is attached to the underside of the flat bed chassis and extends outwardly from a side surface of the flat bed trailer and is angled upwardly to support a bottom edge of a building material slab or sheet.

20 Claims, 7 Drawing Sheets

A-FRAME MOUNTED ON A FLAT BED TRAILER

BACKGROUND OF THE INVENTION

This invention relates to shipping support apparatus mounted on a flat bed trailer. More particularly, it refers to pairs of A-frames mounted on a flat bed trailer for supporting heavy upright loads.

Currently, most heavy loads such as concrete slabs are transported on flat bed trailers by laying them down on the trailer top surface. Glass sheets have been transported in an upright position, secured to shipping racks as seen in U.S. Pat. No. 3,955,676. Sheet supporting racks have been used inside trailers as shown by U.S. Pat. No. 4,273,485 and U.S. Pat. No. 4,527,826. Flat bed trailers of differing configuration for supporting loads have been described in U.S. Pat. Nos. 4,626,017; 4,688,976; and 5,209,540. Although these references describe useful methods of carrying upright loads they do not provide a device for easily loading and unloading building materials constituting heavy loads. Such a device is needed to not only provide easy loading and unloading, but also in employing lighter trailers for carrying such heavy loads within current roadway regulations.

SUMMARY OF THE INVENTION

The present invention solves the prior art need by providing an apparatus for transporting large building structures such as concrete slabs on lighter weight flat bed trailers. The device permits heavy slabs to be leaned against a pair of A-frames mounted on the flat bed trailer instead of being loaded on a top surface of the flat bed trailer. The A-frames are positioned facing oppositely and uprightly with a downwardly descending side leg on each side of the A-frame. The side legs rest at their ends on an axially mounted beam. The beam is attached to the undercarriage of the trailer chassis and has a portion extending outwardly from the right and left side of the trailer. The portion of each beam extending outwardly is angled upwardly to support a bottom edge of a concrete slab with the upper side surface of the slab resting against a side of the A-frame.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
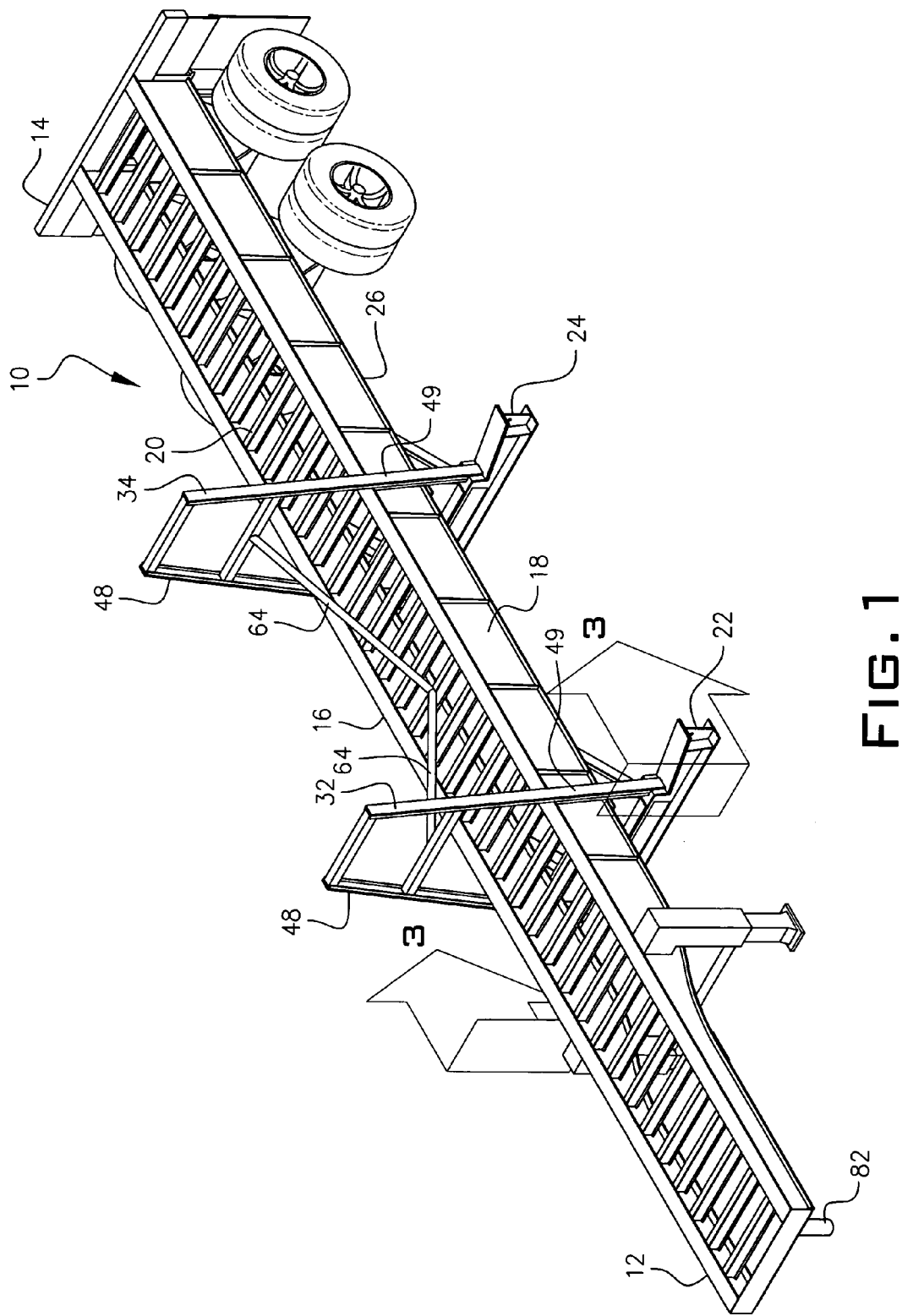
FIG. 1 is a perspective view of a flat bed trailer with a pair of A-frames mounted thereon according to this invention.

Throughout the following detailed description, the same reference numerals refer to the same elements in all figures. Referring to FIG. 1, a flat bed trailer 10 has a front portion 12 attachable by standard methods with a wheel pin 82 to a truck cab. The trailer has a rear portion 14 and a right 16 and left 18 side portion. A top surface 20 has a width of about seventy-eight inches. Beams 22 and 24 are axially mounted to the undercarriage 26 of the flat bed trailer 10, usually by welding to the undercarriage. Alternatively, the beams can be bolted to the undercarriage 26. A portion of each beam 22 and 24 extends outwardly and upwardly from the right 16 and left 18 side of the trailer 10.

Figure 3:
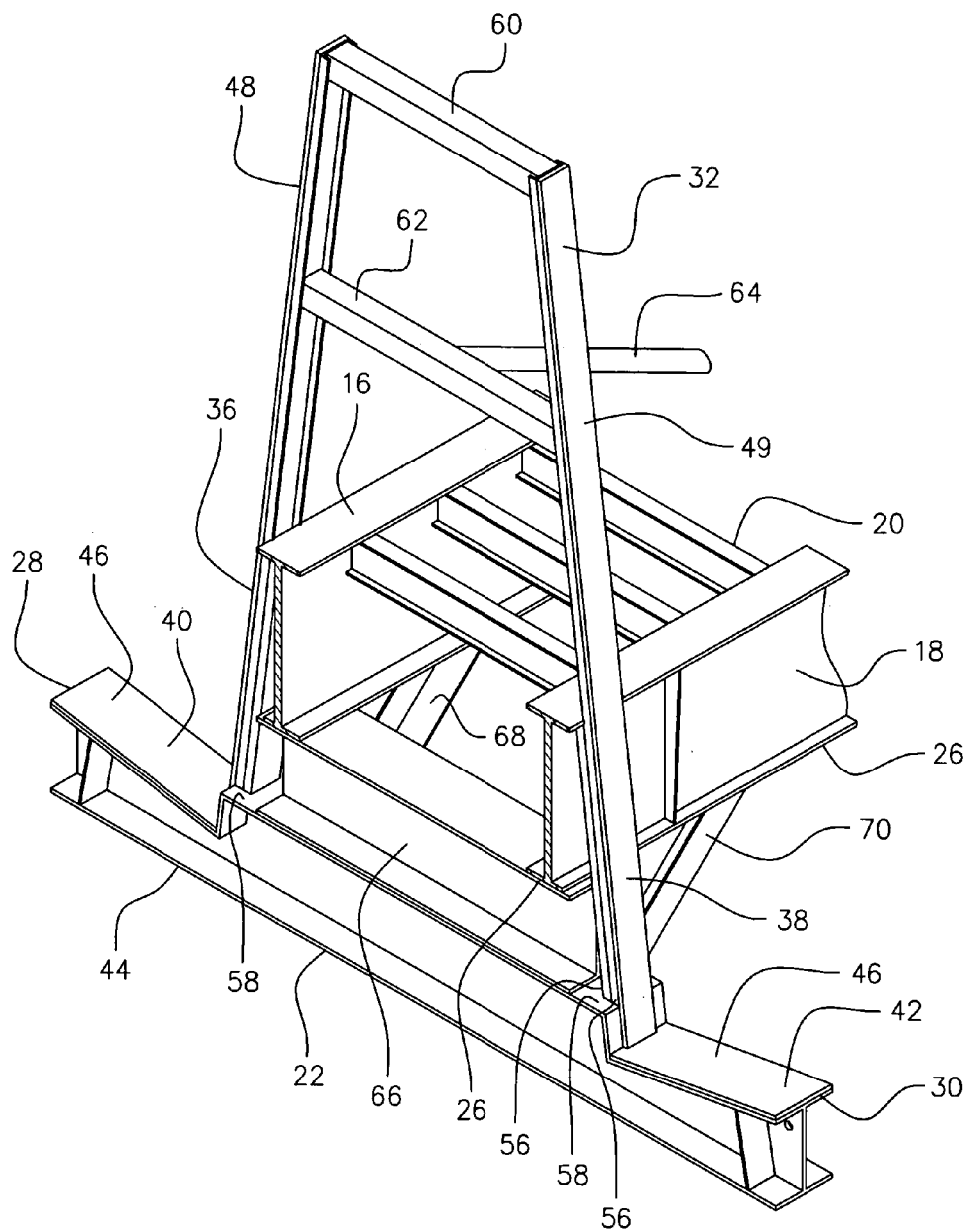
FIG. 3 is a partial sectional view of the mounting elements for an A-frame on a trailer.

Referring to FIG. 3, beam 22 is welded to undercarriage 26. The beam 22 is a two piece construction having a maximum width from end 28 to end 30 of 102 inches. Approximately 24 inches of each end portion of beam 22 projects outwardly and upwardly at an angle of about ten degrees from the respective right 16 and left side 18 of the trailer. A-frame 32 has side legs 48 and 49 resting on outwardly extending portion 40 and 42, respectively of beam 22. Beam 22 has a base component 44 shown in FIG. 4 and a rubber or urethane end pad 46 glued or riveted to the top of outwardly extending portions 40 and 42.

Figure 4:
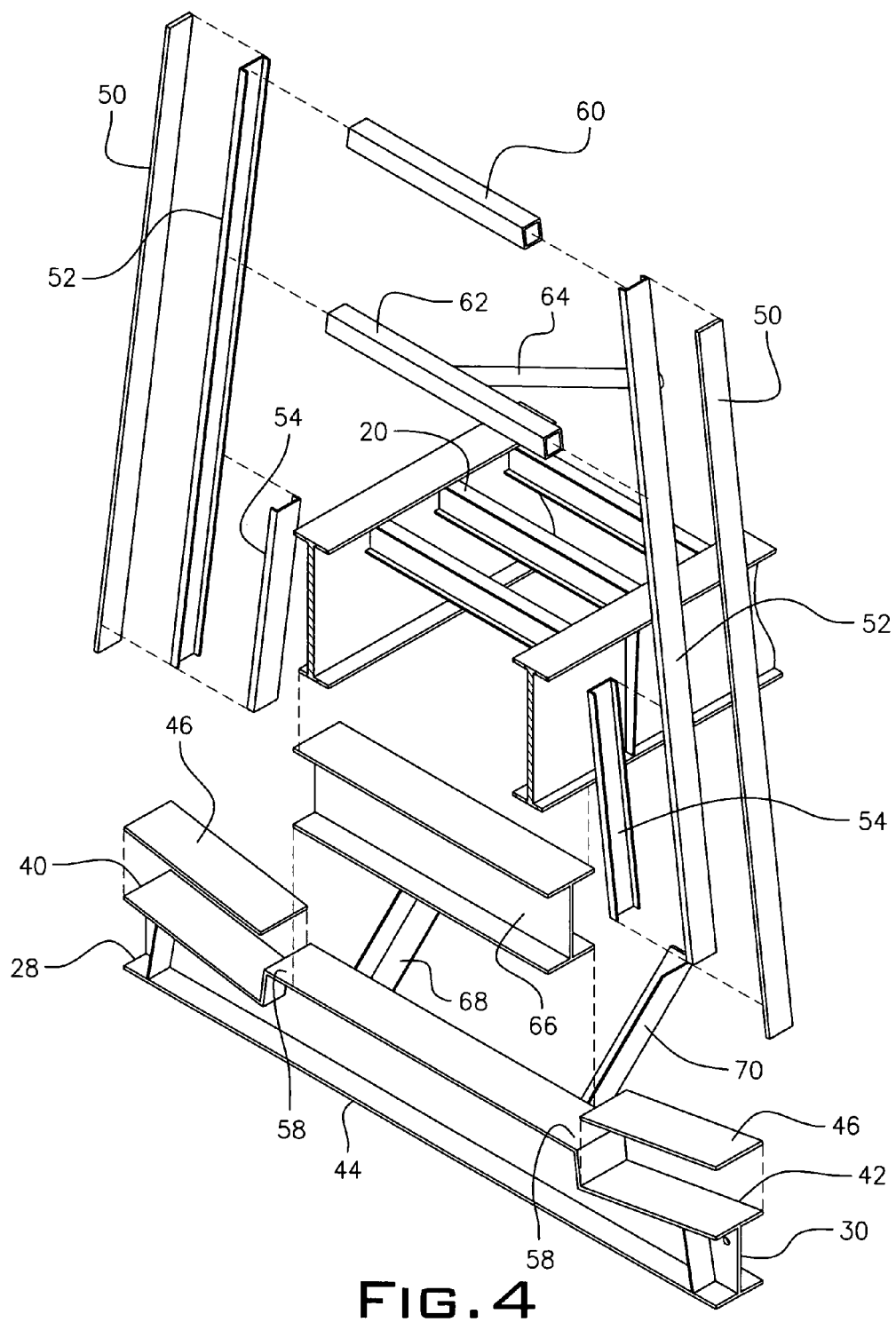
FIG. 4 is an exploded view of the mounting elements shown in FIG. 3.
Figure 5:
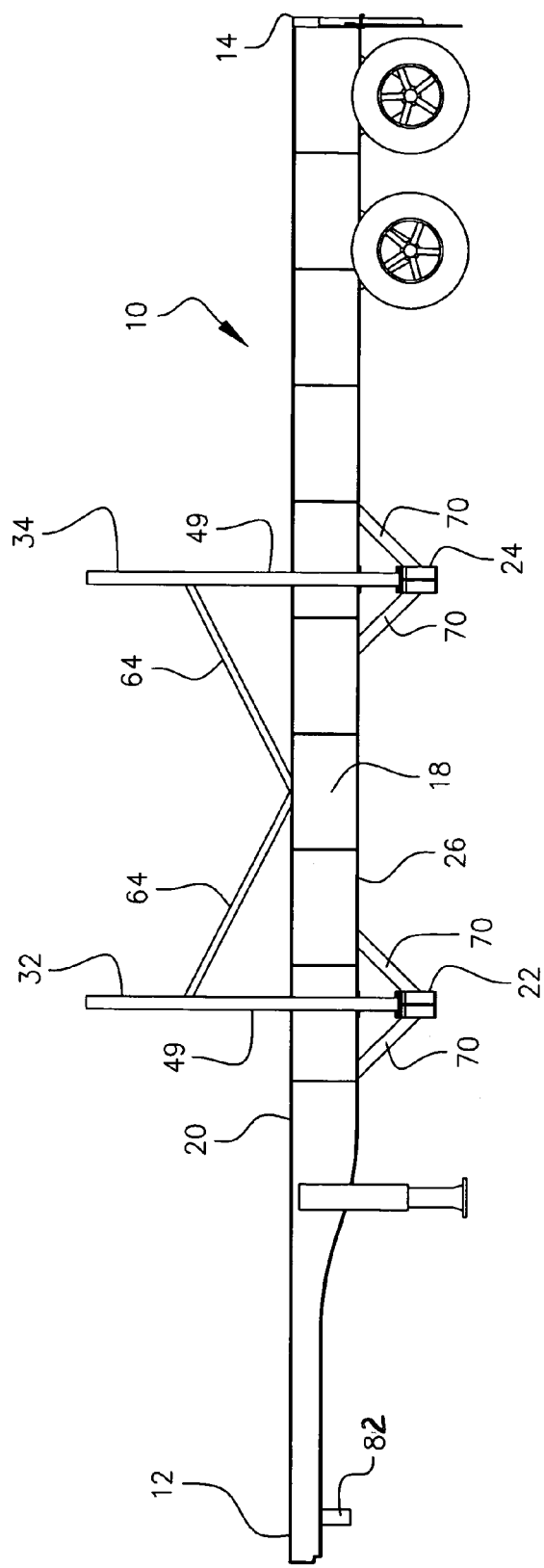
FIG. 5 is an elevational side view of a pair of A-frames mounted on a trailer.

Each A-frame, as shown in FIG. 4, has a pair of legs 48 and 49, each leg having an outer wood layer 50 and engaged C-channels 52 and 54. A bottom end 56 of the C-channels 52 and 54 rest on ledge 58 of beam 22. The wood layer 50 rests on the pad 46. Horizontal members 60 and 62, respectively space legs 48 and 49 apart. Strut 64 supports the A-frame with respect to top surface 20 of the trailer.

Beam component 44 is welded or bolted to an intermediate beam 66 which in turn is welded or bolted to the undercarriage 26 of trailer 10. In addition, struts 68 and 70 are welded to the trailer undercarriage 26 and beam component 44.

Figure 6:
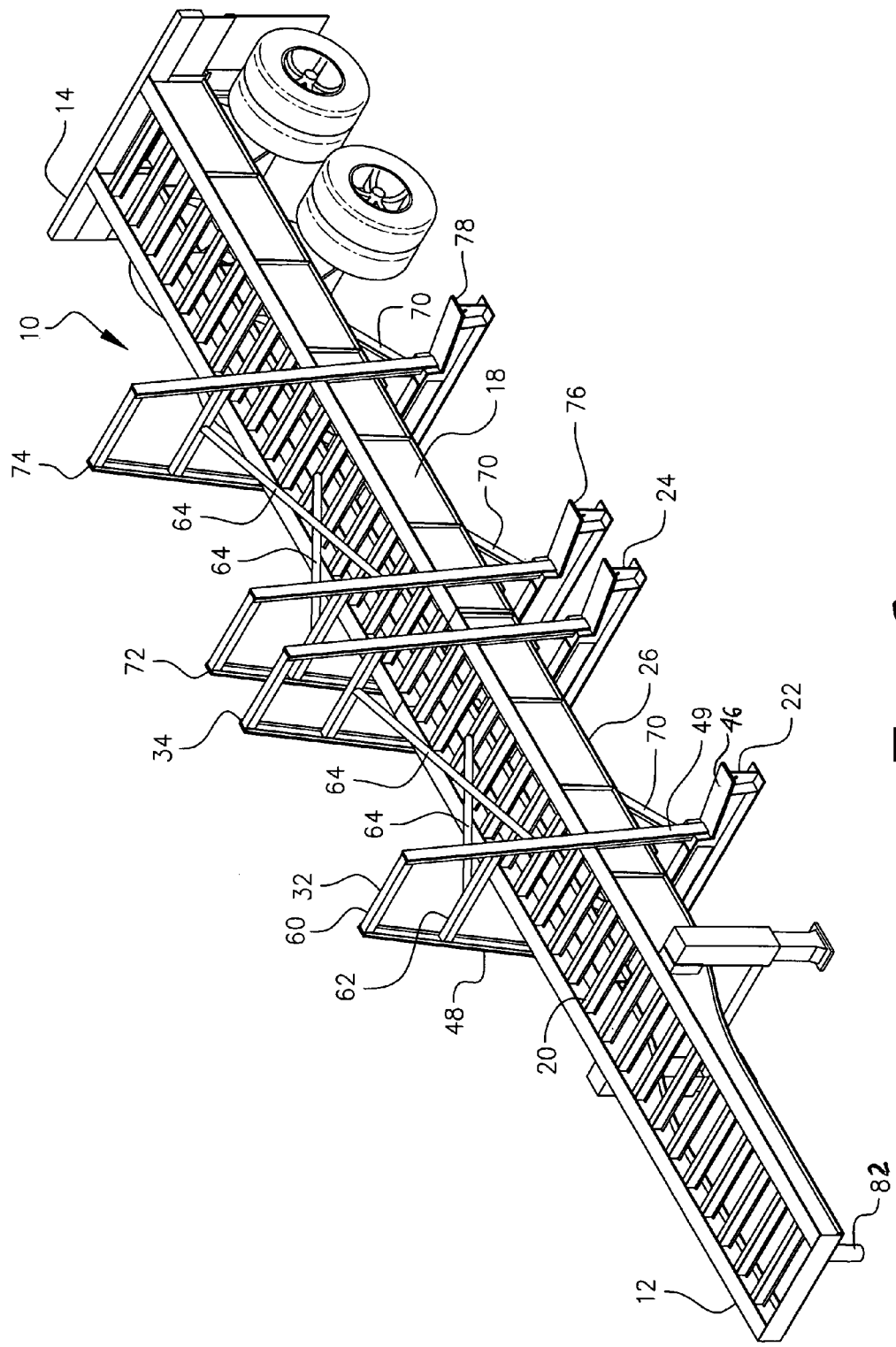
FIG. 6 is a perspective view of a first alternate embodiment employing two pair of A-frames mounted on a trailer.

As seen in FIG. 6, additional A-frames 72 and 74 can be supported on additional beams 76 and 78 so that additional slabs can be carried on a trailer by distributing the load's center of gravity.

Figure 7:
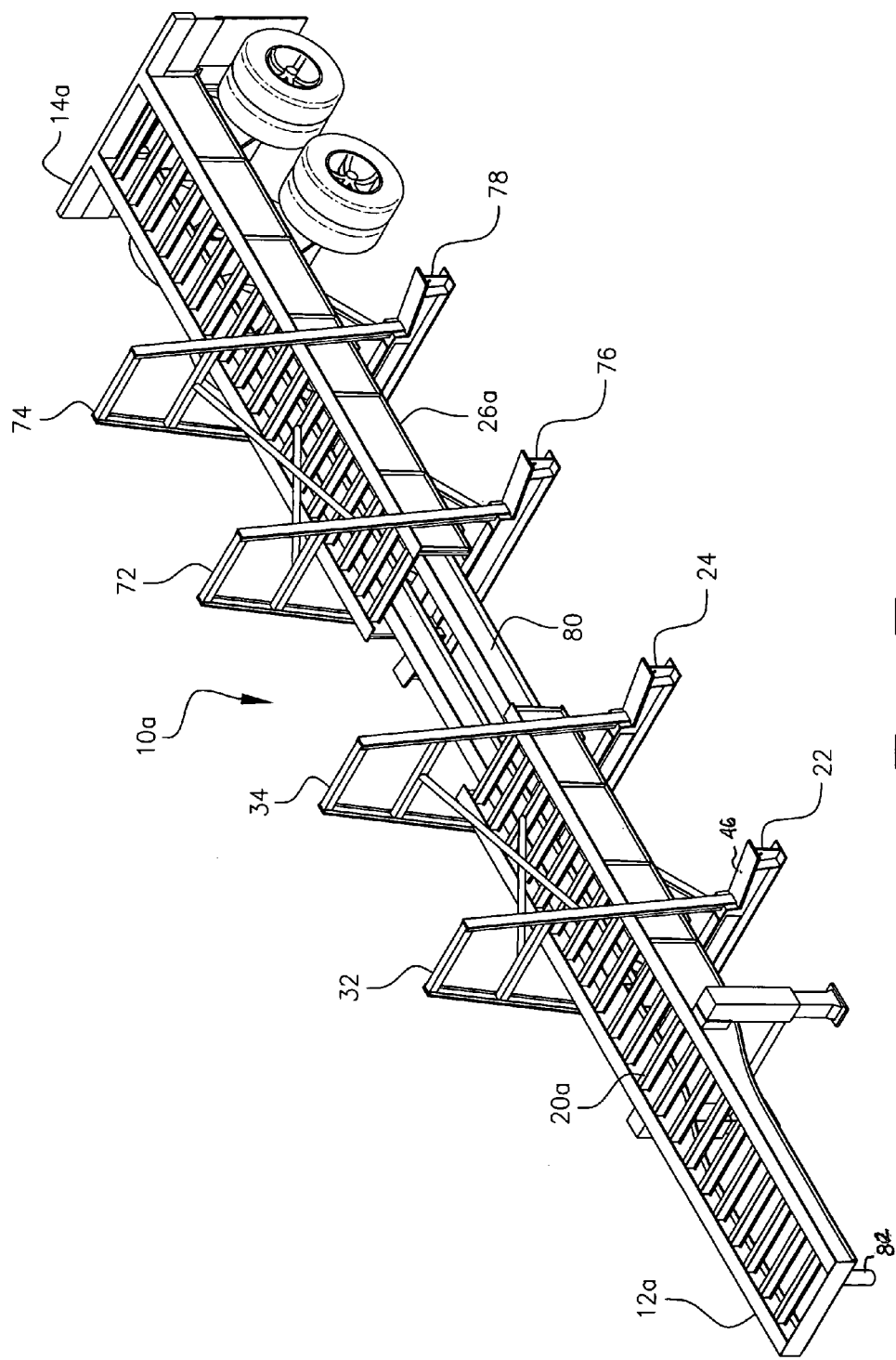
FIG. 7 is a perspective view of a second alternate embodiment employing two pair of A-frames mounted on an expanded trailer.

As seen in FIG. 7, an expandable trailer 10a can be employed with two or more pair of A-frames, 32, 34, 72 and 74 and supported on beams 22, 24, 76 and 78, respectively. The expandable trailer has a rear portion 14a, a front portion 12a, a top surface 20a and an expandable mid-section 80.

Figure 2:
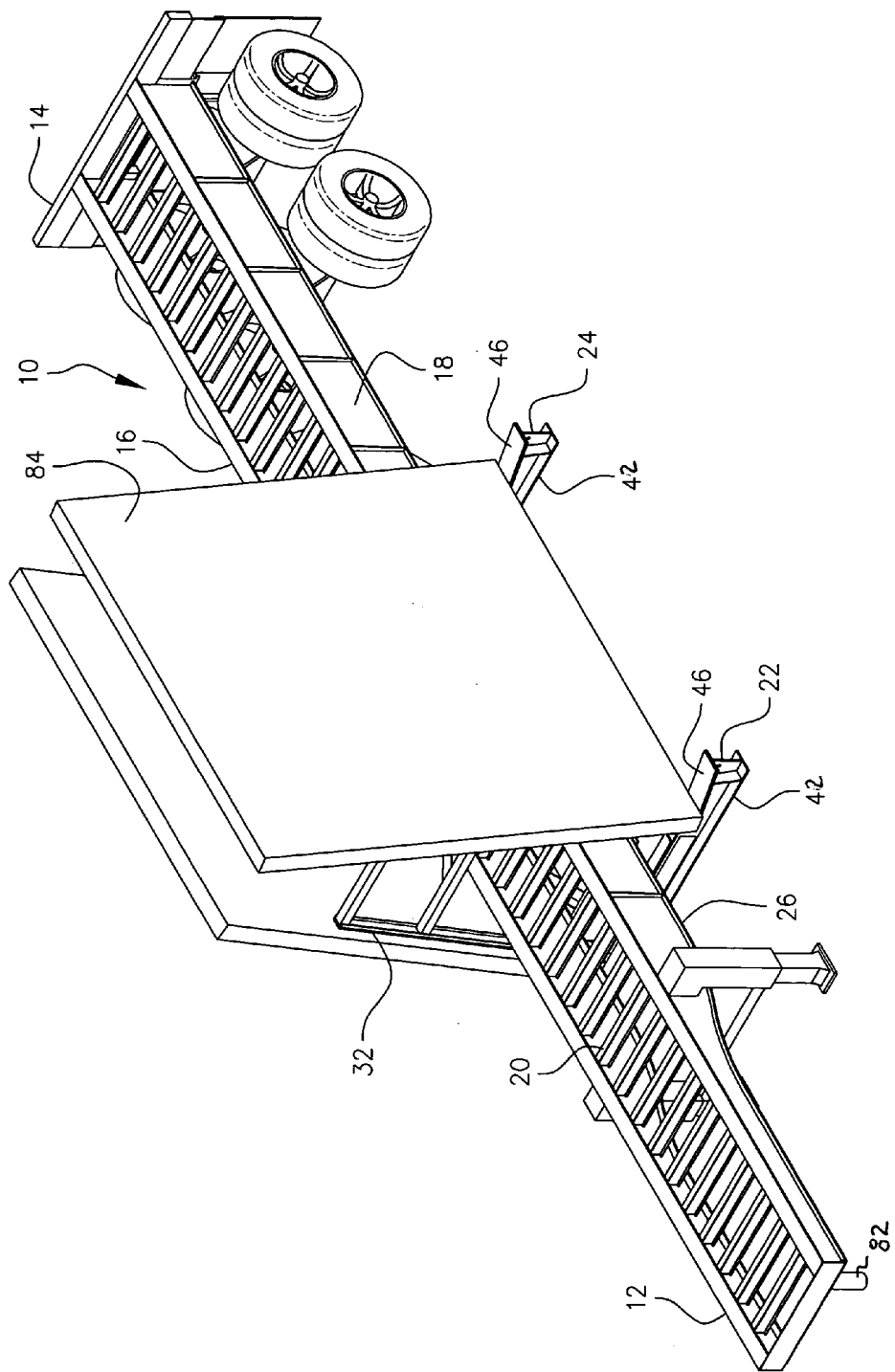
FIG. 2 is a perspective view of a concrete slab mounted on the trailer of FIG. 1.

The A-frames or channels can be made from aluminum, steel, or other high strength material. The beams are steel as is the chassis of the trailer. The trailer 10 or 10a is attached by a wheel pin 82 to a cab for towing of the flat bed trailer. As shown in FIG. 2, a concrete slab 84, steel sheet or other heavy construction material can be loaded on the extended beam ends 40 or 42 and rested on pads 46. The slab 84 leans against legs 49. Usually the slabs are also strapped in place to prevent movement. This arrangement allows concrete slabs to be easily loaded or unloaded from trailer 10 or 10a. The low center of gravity provided by the beam mounting to the trailer undercarriage 26 allows for heavier loads on lighter trailers and the trailer allowable road width of 102 inches is not exceeded. In addition, tall slabs 84 will not exceed the allowable road height of 13 feet, 6 inches.

Other equivalent elements can be substituted for the elements described above to provide substantially the same function in substantially the same way to provide substantially the same result.

What is claimed is:

1. An apparatus mounted on a flat bed trailer chassis for supporting upright building structures during shipment on a public highway, the apparatus comprising:
   a pair of opposed A-frames positioned uprightly on the flat bed trailer chassis;
   a pair of downwardly descending side legs on each side of the A-frame, the side legs descending partially below a top surface of the flat bed chassis and outboard of a right and left side surface of the flat bed chassis;
   the side legs of each A-frame supported by an axially mounted beam attached to an undercarriage of the flat bed chassis, a portion of the beam extending outwardly from the undercarriage of the flat bed chassis and from the right and left side of the flat bed chassis, the beam portion extending outwardly being angled upwardly to support a bottom edge of the building structure with a top portion of the building structure juxtaposed to the side legs on one side of the A-frames.

2. An apparatus according to claim 1 wherein a second pair of A-frames is positioned uprightly on the flat bed chassis.

3. An apparatus according to claim 2 wherein the flat bed chassis on which the A-frames are mounted is expandable.

4. An apparatus according to claim 1 wherein the axially mounted beam has a base component welded to a bottom surface of an intermediate component which in turn is welded to an undercarriage of the chassis along a top surface.

5. An apparatus according to claim 1 wherein the A-frames each have a top horizontal connecting member and a lower horizontal connecting member connecting the pair of downwardly descending side legs.

6. An apparatus according to claim 5 wherein a strut connects the lower horizontal connecting member to the top surface of the flat bed chassis.

7. An apparatus according to claim 1 wherein a strut connects the axially mounted beam to an undercarriage of the flat bed chassis.

8. An apparatus according to claim 1 wherein the building structure is a concrete slab.

9. An apparatus according to claim 1 wherein the building structure is a steel slab.

10. An improved apparatus for transporting building structures on a public highway on a pair of opposed A-frames positioned uprightly on a flat bed trailer chassis, the improvement comprising:
    a pair of downwardly descending side legs on each side of the A-frame, descending partially below a top surface of the trailer chassis and outboard of a right and left side surface of the trailer chassis;
    the side legs of each A-frame supported by an axially mounted beam attached to an undercarriage of the flat bed chassis, a portion of the beam extending outwardly from the undercarriage of the flat bed chassis and from the right and left side of the flat bed chassis; and
    the portion of the beam extending outwardly being angled upwardly to support a bottom edge of the building structure, with a top portion of the building structure juxtaposed to the side legs on one side of the A-frames.

11. The improved apparatus according to claim 10 wherein the beam portion extending outwardly is angled upwardly at an angle of about ten degrees.

12. The improved apparatus according to claim 10 wherein the beam portion extending outwardly has a top surface covered with a rubber pad.

13. The improved apparatus according to claim 10 wherein the axially mounted beam has a base component welded at a top surface to a bottom surface of an intermediate component, a top surface of the intermediate component welded to the undercarriage of the flat bed chassis.

14. The improved apparatus according to claim 10 wherein a strut connects the axially mounted beam to an undercarriage of the flat bed chassis.

15. The improved apparatus according to claim 10 wherein the building structure is a concrete slab.

16. An apparatus mounted on a flat bed trailer chassis for supporting upright building structures during shipment on a public highway, the apparatus comprising:
    a pair of opposed A-frames positioned uprightly on the flat bed trailer chassis;
    a pair of downwardly descending side legs on each side of the A-frame the side legs descending partially below a top surface of the flat bed chassis and outboard of a right and left side surface of the flat bed trailer chassis;
    a top horizontal member and a lower intermediate horizontal member connecting each pair of side legs above the top surface of the flat bed trailer chassis;
    a strut connecting the intermediate horizontal member to the top surface of the flat bed trailer chassis;
    the side legs of each A-frame supported by an axially mounted beam attached to an undercarriage of the flat bed trailer chassis, a portion of the beam extending outwardly from the undercarriage of the flat bed trailer chassis and from the right and left side of the flat bed trailer chassis, the beam portion extending outwardly being angled upwardly to support a bottom edge of the building structure with a top portion of the building structure juxtaposed to the side legs on one side of the A-frames; and
    the beam further connected to the undercarriage of the flat bed trailer chassis by a strut.

17. The apparatus according to claim 16 wherein the beam portion extending outwardly is angled upwardly at an angle of about ten degrees.

18. The apparatus according to claim 16 wherein the beam portion extending outwardly is covered with a rubber mat.

19. The apparatus according to claim 16 wherein the building structure is a cement slab.

20. The apparatus according to claim 16 wherein there are two pair of opposed A-frames positioned uprightly on the flat bed trailer chassis.

* * * * *